United States Patent

[11] 3,602,565

[72] Inventor Albert O. England, Jr.
5225 Gould Ave., LaCanada, Calif. 91011

[21] Appl. No. 857,458
[22] Filed Sept. 12, 1969
[45] Patented Aug. 31, 1971

[54] TELEPHONE ENCLOSURE
8 Claims, 3 Drawing Figs.

[52] U.S. Cl. .......... 312/237, 312/21, 312/208, 312/237, 312/300, 179/127
[51] Int. Cl. .......... A47b 83/00, A47b 88/00, H04r 21/02
[50] Field of Search .......... 312/237, 21, 194, 208, 242; 108/50; 248/27; 179/146, 147, 179, 10, 12

[56] References Cited
UNITED STATES PATENTS

| | | | |
|---|---|---|---|
| 1,926,827 | 9/1933 | Turck | 312/300 X |
| 2,878,324 | 3/1959 | Guerrero | 179/146 |
| 3,480,741 | 11/1969 | Wiggins | 179/146 |

*Primary Examiner*—Paul R. Gilliam
*Attorney*—Christie, Parker & Hale

ABSTRACT: A telephone enclosure includes a cover disposed over a telephone body. The cover has openings through it to expose the control panel of the telephone, and to permit the telephone cradle to project above the cover. Support means are provided for holding the telephone body with respect to the cover so the control panel on the telephone is substantially parallel with a major plane of the cover.

PATENTED AUG 31 1971

3,602,565

INVENTOR.
ALBERT O. ENGLAND, JR.

BY

Christie, Parker, & Hale
ATTORNEYS

TELEPHONE ENCLOSURE

This invention relates to enclosures for telephones. A typical commercial telephone includes a body with a substantially flat bottom and a control panel inclined at an acute angle with respect to the bottom. A pair of upwardly opening U-shaped ears extend upwardly from the telephone body to form a cradle which receives and holds a headset through which telephone messages are transmitted and received. Such telephones usually are placed on the top of desks or tables where they occupy workspace and add to clutter.

This invention provides an improved enclosure for a conventional commercial telephone. The enclosure is preferably adapted to be mounted in the top surface of a table or desk to conceal the unsightly portion of a telephone without interfering with the normal use of the instrument, and without requiring any adjustment, modification or disassembly of the telephone. The enclosure preferably holds the telephone so the normally inclined control panel is in a substantially horizontal plane. The surrounding cover preferably has a major plane substantially parallel to that of the control panel, and thereby minimizes the useful working space occupied by the telephone.

Briefly, the enclosure includes a cover disposed over the telephone body. The cover has a major, substantially horizontal plane. An opening through the cover exposes at least a portion of the telephone control panel and permits the telephone ears or cradle to project above the cover and receive and hold the telephone headset. Means are provided for supporting the bottom of the telephone body at an acute angle relative to the major plane of the cover so the control panel is substantially horizontal.

Preferably, separate openings are provided for the telephone ears and control panel and help hold the telephone body firmly in place. The cover is also preferably downwardly recessed adjacent the ears to receive the ends of the telephone headset. In the preferred form, the telephone is supported relative to the cover by a hinged bracket which is secured to the underside of the cover, extends downwardly and away from the cover to underlie the telephone bottom, and then includes an upwardly extending section which is clamped to the underside of the cover to hold the telephone body in place.

These and other aspects of the invention will be more fully understood from the following detailed description and the accompanying drawings in which.

Figures 1, 2:
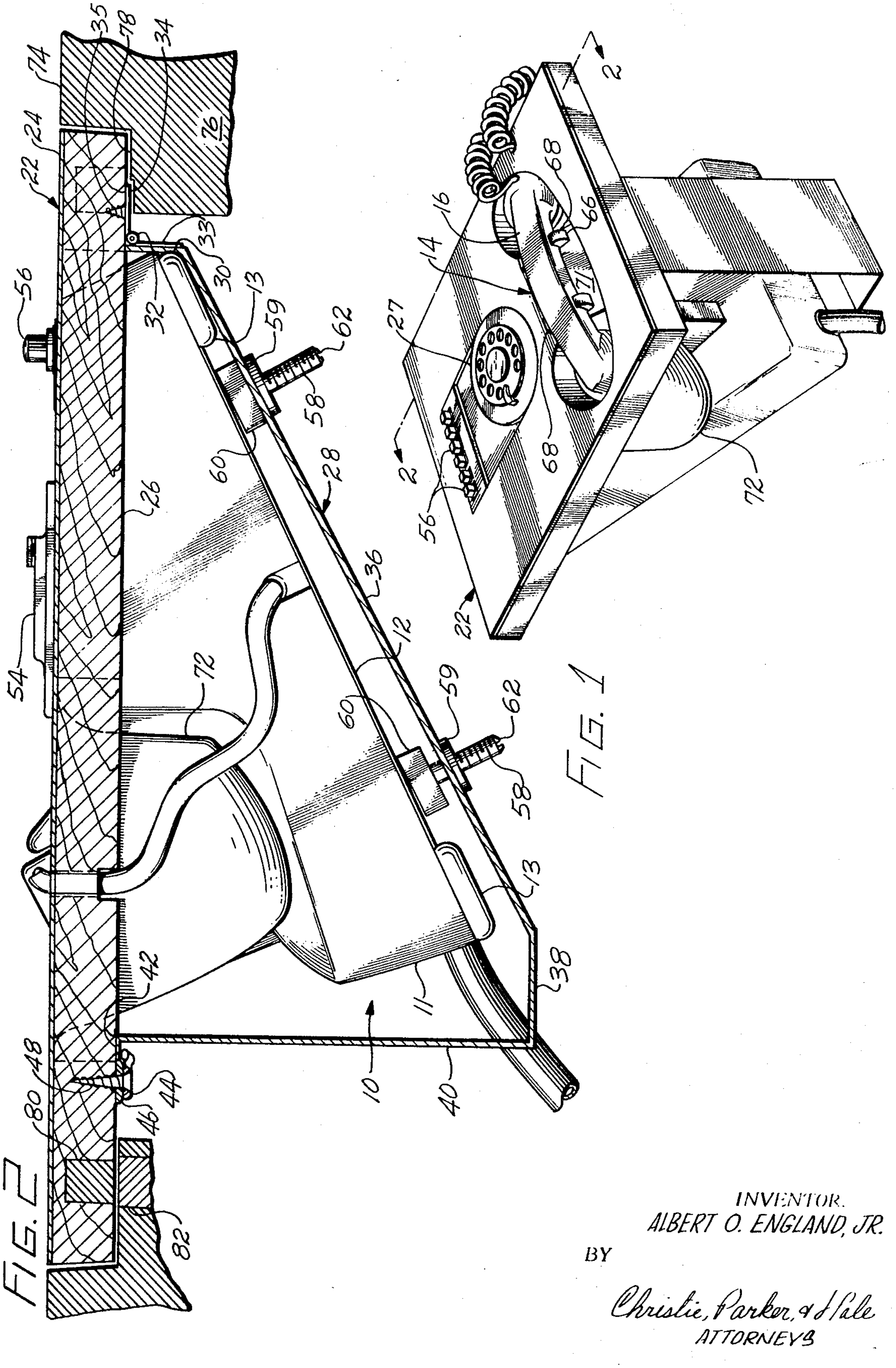
FIG. 1 is a perspective view of the presently preferred enclosure.
FIG. 2 is a view taken on line 2—2 of FIG. 1.

Referring to the drawings, a conventional telephone 10 includes a body 11 with a flat bottom 12 and padded feet 13 normally adapted to rest on a horizontal supporting surface (not shown). A conventional headset 14 includes the usual elongated handle 16 with an earpiece 17 at one end and the conventional mouthpiece or microphone 18 at the other end. The headset is connected by coiled conductor 20 to the body of the telephone.

A cover 22 in the form of a relatively thin sheet 24 of plastic bonded to the upper surface of a flat rectangular plywood board 26 is disposed over the telephone. Although the board 26 can be of any suitable material and thickness, a piece of plywood thirteen-sixteenths in. thick has proved to be satisfactory.

The major plane of the plastic sheet and plywood board is substantially horizontal. The telephone body is supported with the bottom of the telephone at an acute angle to the bottom of the cover, and so a flat control panel 27 on the upper portion of the body is horizontal and substantially flush with the top surface of the cover as shown best in FIG. 2. An upwardly opening and generally U-shaped bracket 28 includes an upwardly extending short leg 30 which terminates at its upper end against the bottom of the plywood board. A hinge 32 is secured to the outer face of the short leg 30 and to the bottom of the plywood board so that the U-shaped support bracket can pivot about a horizontal axis extending in the same general direction as the handle of the telephone headset. Preferably, one side 33 of the hinge is spot welded to the outer face of the short leg 30. The other side 34 of the hinge is secured by wood screws 35 to the undersurface of the plywood board.

A downwardly and inwardly inclined leg 36 of the U-shaped bracket extends from the lower end of the short leg 30 and is bent to form a horizontal leg 38 which is formed integrally at its left (as viewed in FIG. 2) end with the lower end of a vertical leg 40 which includes an outwardly extending horizontal flange 42 at its upper end against the undersurface of the plywood board.

A pair of plastic catches 44 are each secured against a respective rubber washer 46 by wood screws 48 to the underside of the plywood board. The catches rotate in a horizontal plane about their respective screws to slide under the bracket flange 42 so that the support bracket can be latched in the position shown in FIG. 2 or released so that the bracket and telephone can pivot downwardly and to the right about the horizontal axis of hinge 32.

The plywood board includes an enlarged T-shaped opening 50 in its central portion to receive the telephone control panel and the upper portion of the telephone body. The control panel is inclined at an acute angle to the bottom of the telephone body so that when the telephone body is clamped in the position shown in FIG. 2, the control panel is substantially horizontal, i.e., it lies in the major plane of the telephone cover. The telephone control panel includes the usual selector dial 54, and the model shown in the drawings includes selector buttons 56 for an internal communication system.

A pair of longitudinally spaced and upwardly and inwardly extending adjustable screws 58 are each threaded through a respective nut 59 spot welded to the bottom of the downwardly and inwardly extending leg 36 of the telephone support bracket 28. The upper end of each adjustable screw projects above the leg 36 of the U-shaped bracket and carries a respective pad 60 which bears against the bottom of the telephone. A slot 62 in the lower end of each screw permits the screws to be adjusted to clamp the telephone firmly against the plastic sheet 24 which is bonded to the top surface of the plywood board by a suitable means.

Figure 3:
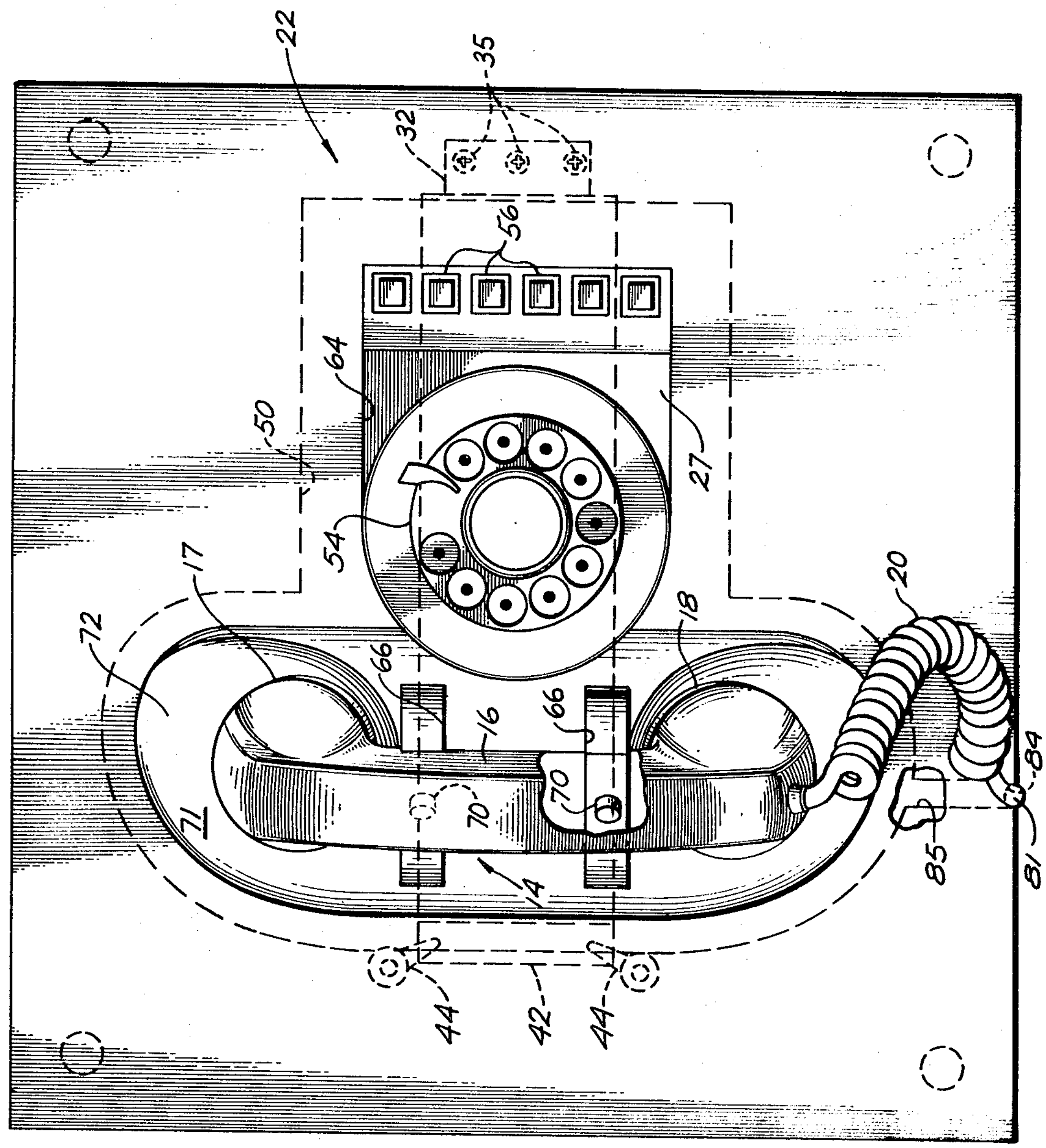
FIG. 3 is a plan view of the enclosure mounted in a desk top.

As shown best in FIG. 3, the plastic sheet is coextensive with the plywood board. The plastic sheet extends over the opening 50 in the plywood board, but is cut out in a relatively large opening 64 which just exposes the selector dial and internal communication buttons. The plastic sheet also includes a pair of elongated parallel slots 66 each of which fits snugly around a respective upwardly extending and upwardly opening U-shaped ear 68 which extends from the top of the telephone body up through the plastic sheet. A conventional, vertically movable hook switch button 70 projects upwardly from the central portion of each U-shaped ear. The ears form the conventional telephone cradle which receives and holds the elongated handle of the telephone headset. The handle depresses the hook switch buttons when the headset is placed in the cradle. The plastic sheet is depressed in the area 71 around the U-shaped ears and telephone headset to form receptacles or pockets 72 for the headset earpiece and mouthpiece so that the headset is substantially flush with the top of the telephone cover when the headset is placed in the cradle. The depressed portion of the plastic sheet in the vicinity of the telephone headset is generally in the shape of a dumbbell split longitudinally so that there is a separate downwardly extending and upwardly opening pocket formed below the cover to receive the earpiece and mouthpiece of the headset.

In a typical installation, the telephone enclosure is mounted in the top 74 of a desk, table or the like which has an opening 76 cut in it to receive the enclosure. Preferably, an inwardly extending shoulder 78 is formed around the opening 76 to provide a ledge on which the plywood board can rest. Preferably, the depth of the shoulder is equal to the combined thickness of the plywood board and plastic sheet that form the cover so that the top surface of the plastic sheet is flush with that of the top of the desk or table. Magnetic plugs or catches 80 are embedded in the lower portion of the plywood board to overlie similar magnetic catches 82 embedded in the outwardly extending portions of the shoulder 78 so the telephone enclosure is held firmly in place.

A vertical semicircular groove 84 in the right (as viewed in FIG. 3) side of the cover receives the telephone conductor 20 to permit passage between the cover 22 and the surrounding portion of the desk. A horizontal slot 85 in the bottom of the cover connects the vertical groove 84 with the generally T-shaped opening 50 to provide a continuous passage for the telephone cord from the telephone body to the handset.

Thus, this invention provides an aesthetic telephone cover which conceals all the telephone except that portion which must be exposed for use of the instrument, and present a neat appearance with a minimum reduction in flat workspace.

I claim:

1. An enclosure for mounting a telephone in the top of a table, a desk, and the like, the telephone including a body with a substantially flat bottom, a selector dial inclined at an acute angle with respect to the bottom, upwardly extending ears to form a cradle, a handset shaped to rest in the cradle, and a cord extending from the body to the handset, the enclosure comprising a cover substantially flush with the top and releasably mounted in the top over the telephone body so as to overlie a major portion of the telephone body, the cover having a major, substantially horizontal plane, and an opening to expose at least a portion of the selector dial and to permit the telephone ears to project above the cover and permit passage of the cord so the handset is above the cover, a bracket including an elongated base portion for supporting the bottom of the telephone body and a separate end portion integral with each end of the base portion, and means for securing each end portion in a fixed position with respect to the cover, with the bottom of the telephone body being at an acute angle relative to the major plane of the cover so the selector dial is substantially horizontal.

2. Apparatus according to claim 1 in which the cover includes separate respective openings to receive each of the upwardly extending ears and control panel.

3. Apparatus according to claim 1 in which the cover is downwardly recessed around the ears to form pockets which receive the ends of the headset.

4. Apparatus according to claim 1 in which the end portions of the bracket are secured to the bottom of the cover to hold the telephone body in place.

5. Apparatus according to claim 4 in which one end portion of the bracket is hinged to the bottom of the cover and in which the other end portion of the bracket is releasably secured to the bottom of the cover.

6. Apparatus according to claim 4 which includes means for adjusting the position of the telephone body with respect to the bracket.

7. Apparatus according to claim 1 in which the cover includes a separate opening at its edge to permit passage of the cord.

8. An enclosure for mounting a telephone in the top of a table, desk, and the like, the telephone including a body with a substantially flat bottom, a selector dial inclined at an acute angle with respect to the bottom, upwardly extending ears to form a cradle, a handset shaped to rest in the cradle, and a cord extending from the body to the headset, the enclosure comprises a cover substantially flush with and releasably mounted in the top over the telephone body so as to overlie a major portion of the telephone body, the cover having a major, substantially horizontal plane, a first opening to expose at least a portion of the selector dial, a second opening to permit the telephone ears to project above the cover, and a third opening at the edge of the cover to permit passage of the cord so the handset is above the cover, the cover being downwardly recessed around the ears to form pockets which receive the ends of the handset; and a bracket for supporting the bottom of the telephone body, the bracket being hinged at one end to the bottom of the cover and being releasably secured at the other end to the bottom of the cover to hold the bottom of the telephone body at an acute angle relative to the major plane of the cover so the selector dial is substantially horizontal.